June 28, 1955  W. L. BAKER ET AL  2,711,558
MOLDING APPARATUS
Filed Jan. 23, 1951  4 Sheets-Sheet 4
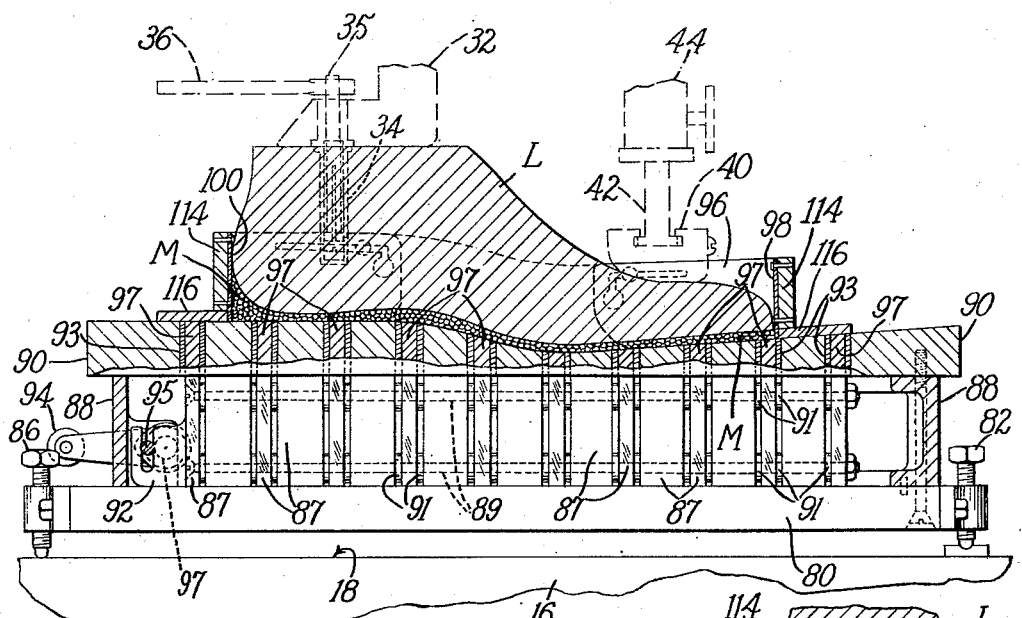
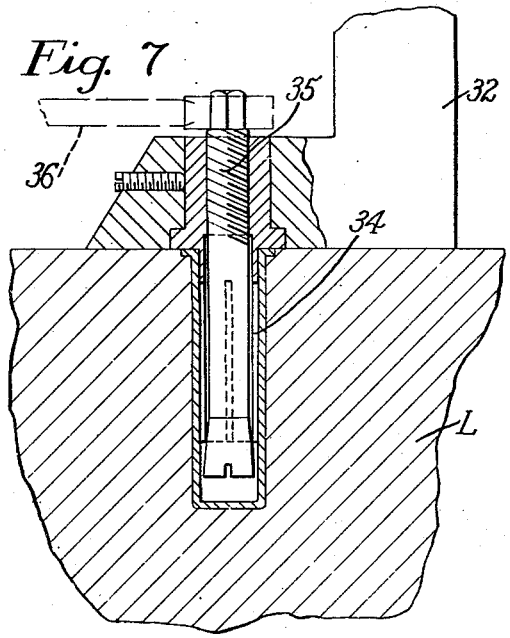
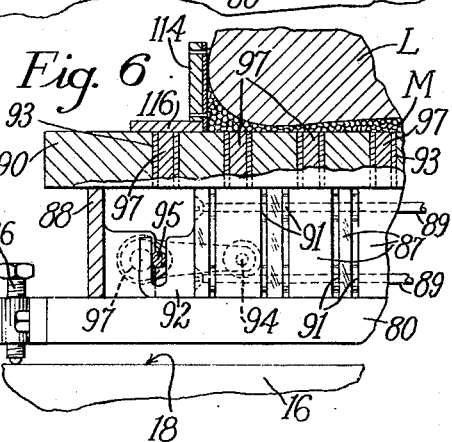
Inventors
Willard L. Baker
Harry D. Goodnow
By their Attorney

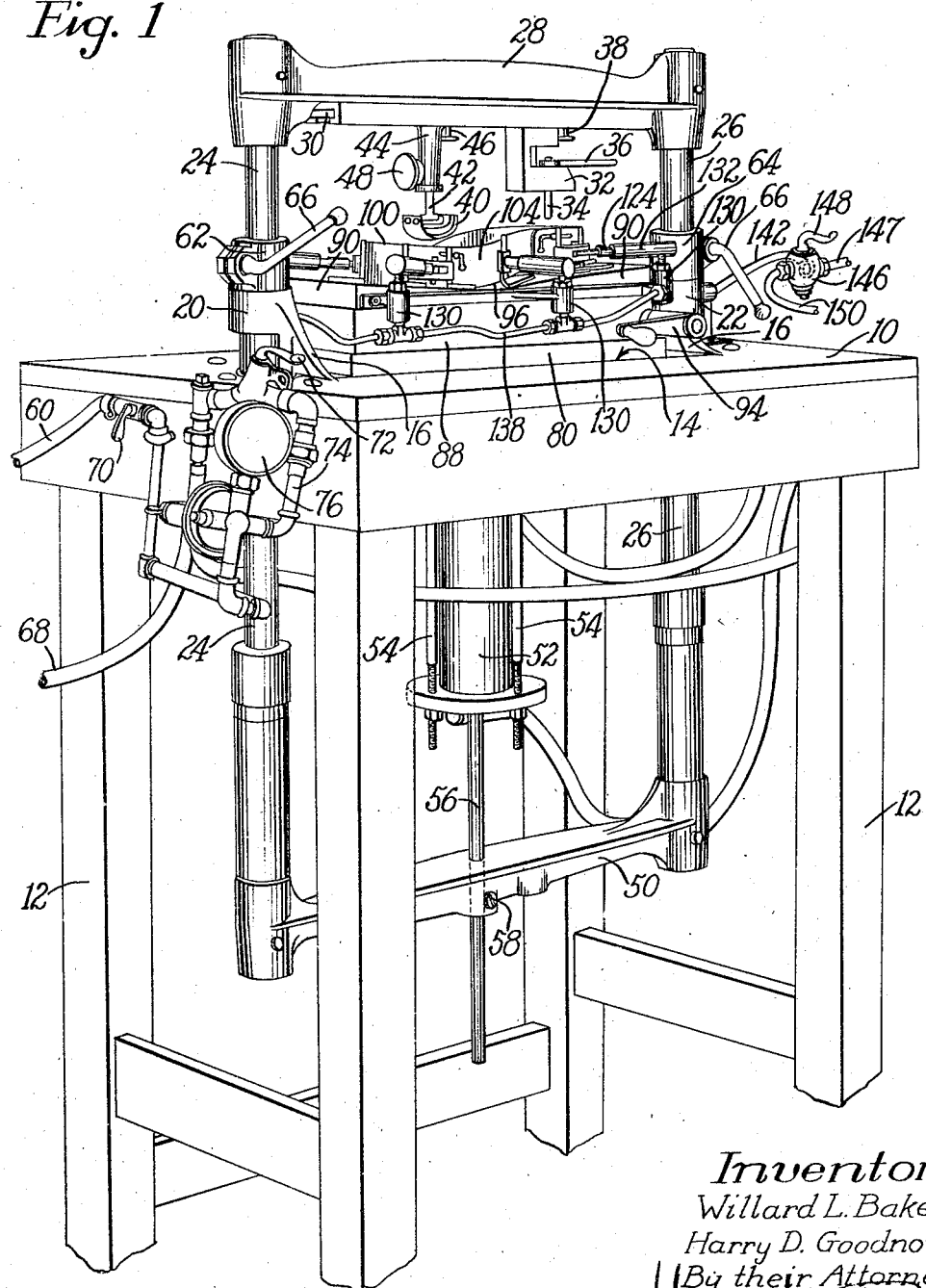

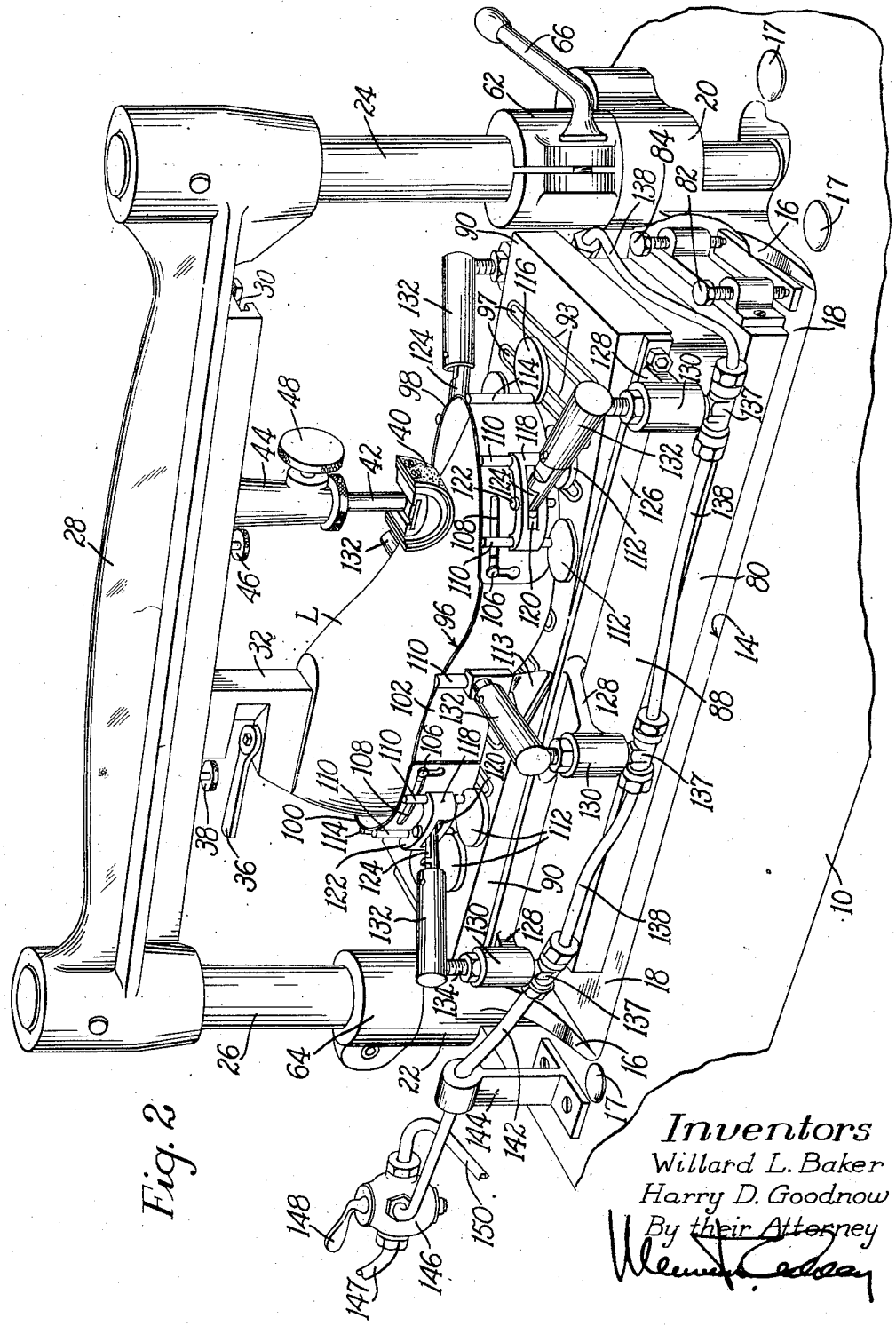

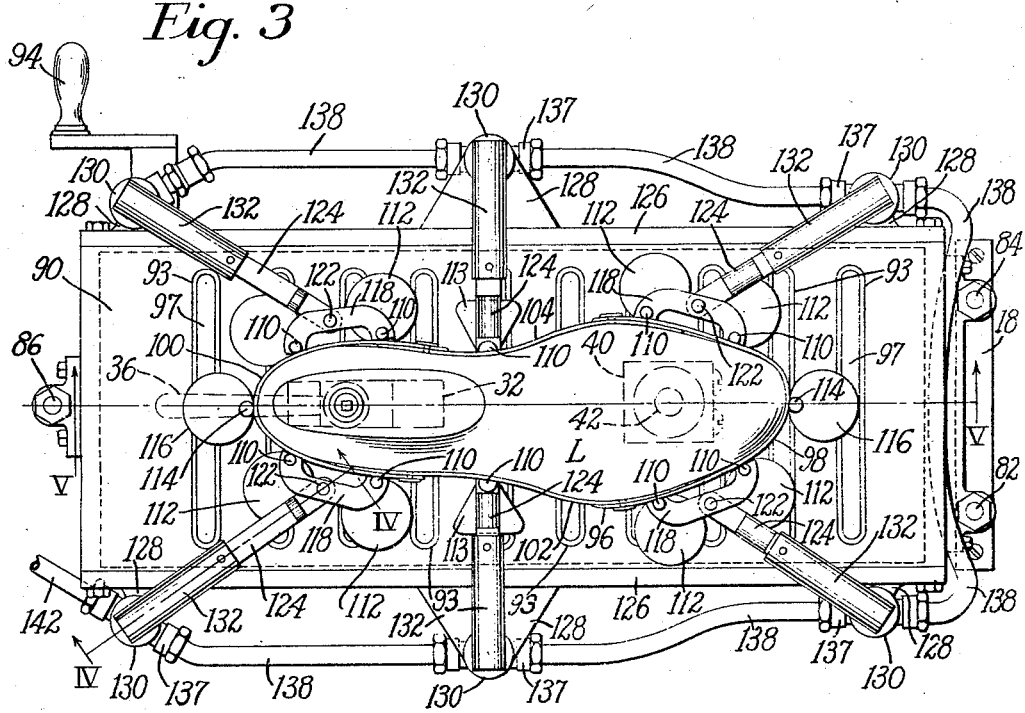
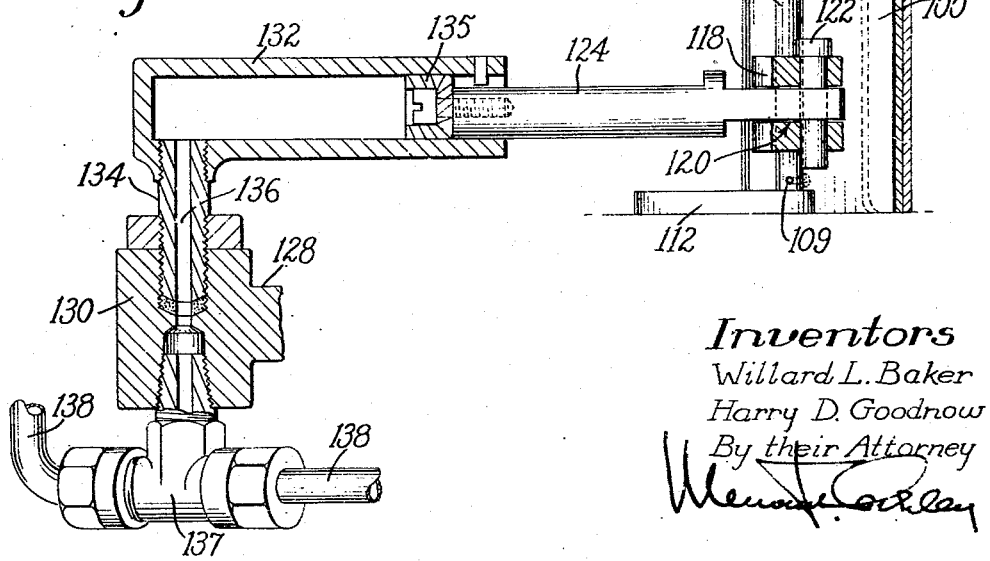

United States Patent Office 2,711,558
Patented June 28, 1955

2,711,558

MOLDING APPARATUS

Willard L. Baker, Ipswich, and Harry D. Goodnow, Melrose, Mass., assignors to United Shoe Machinery Corporation, Flemington, N. J., a corporation of New Jersey Application January 23, 1951, Serial No. 207,248

8 Claims. (Cl. 18—5)

This invention relates to apparatus for use in determining the shapes of the peripheries or contours of objects and is illustrated herein by way of example as embodied in a molding device for use in pressing innermolds for shoes.

Innermolds for shoes are usually made from plastic o moldable material and are pressed to the desired shape and thickness between a pair of molds. The outlines or peripheries of such innermolds should, of course, conform closely to the peripheries of the insides of the shoes in which they are to be worn. Shoes vary greatly in size and shape, however, and it would obviously be too slow and too costly for a manufacturer to provide a separate set of molds for each innermold produced, each mold conforming in outline to the periphery of the inside of the particular shoe in which it was to be used.

To overcome this difficulty, manufacturers have sometimes resorted to pressing innermolds between molding surfaces or molds having no edges or side walls to confine the moldable material to the desired peripheral outline. They have thus molded innermolds to a size much larger than desired and then trimmed them down to proper size by hand. These procedures are not satisfactory because they are not accurate and they are too time consuming and expensive.

An object of the present invention is to provide an improved apparatus for use in pressing innermolds or other objects from moldable material in which the difficulties mentioned above are eliminated. A further object of the invention is to provide a device of the type referred to in which an inner mold can be produced more accurately, faster and cheaper than in devices used heretofore for that purpose. A still further object is to provide a quick and efficient means for accurately determining the shapes of the peripheries or outlines of objects.

To these ends, the invention provides, in accordance with one aspect, an improved device or apparatus in which an object can be rigidly supported, and having means thereon for determining the contour or periphery of the object, said means comprising a closed flexible member in the form of a fence or dam arranged to surround the object and to move into and out of engagement with the object by contracting and expanding lengthwise of itself. When the flexible member comes into engagement with the side walls of the last or other objct supported in the device, it will conform itself to the periphery of said object, thereby determining the shape of said periphery. For expanding and contracting the flexible member operator controlled means is provided, and suitable means is provided for supporting the flexible member during its contracting and expanding movement. In order to maintain the shape defined by the flexible member after it is brought into engagement with the supported object means is provided for locking the flexible member in any position into which it may be moved, said means being carried by the mechanism on which the object is supported. As herein illustrated, the flexible member is composed of magnetizable material, such as iron or steel, and is made up in overlapping sections so that it can expand and contract while still remaining closed. Moreover, it is caused to expand and contract lengthwise by fluid pressure operated means under the control of an operator.

The periphery of the object thus determined by the closed flexible member is next caused to be definitely established or "frozen," so that a molding operation can be performed with the aid of said member, or so that measurements can be taken therefrom, by holding or locking the flexible member in the position which it assumed after it engaged the side wall of the object and conformed lengthwise to its periphery or outline. As herein illustrated, this means comprises a magnetic chuck of any conventional type whereby a magnetic flux or field may be set up in the space occupied by the fence, thereby magnetizing the fence and holding it rigidly in position. The flexible member may then be used as a wall or dam in performing a molding operation, for example, in pressing an innermold for a shoe or, if desired, it may be used merely to establish or define the exact shape or contour of the periphery of the object in a plane substantially normal to the plane of the fence. In either case, the object, such as the last or form referred to, may be removed from within the space enclosed by the fence and the latter utilized in the desired manner without danger of losing the shape of the periphery of the object during any subsequent operations that may be performed by the device.

With the above and other objects and features in view, including the provision of means for varying the angular relation of the flexible member to the object operated upon, the invention will now be described in detail in connection with the accompanying drawings and will thereafter be pointed out in the claims.

In the drawings:

Fig. 1 is a perspective view of a molding apparatus which constitutes one illustrative embodiment of the present invention;

Fig. 2 is an enlarged perspective view of the molding instrumentalities of the apparatus operating to press an innermold for a shoe, the mechanism being viewed from the rear left-hand corner of Fig. 1;

Fig. 3 is a plan view of the molding instrumentalities in the position shown in Fig. 2 but with the means for supporting the upper mold or form omitted;

Fig. 4 is an enlarged vertical section through one of the fluid pressure operated members taken on the line IV—IV of Fig. 3;

Fig. 5 is a longitudinal vertical section taken on the line V—V of Fig. 3;

Fig. 6 is a vertical section similar to Fig. 5 of the left-hand portion of the apparatus with the mechanism in a different position; and Fig. 7 is a greatly enlarged vertical section through the member which holds an object such as a last or form rigidly in the apparatus.

The device of the present invention is illustrated herein, by way of example, as embodied in an apparatus for use in making innermolds for shoes although the device is not limited in its utility to such use since it could obviously be utilized for other purposes or operations. The apparatus is herein illustrated as being mounted on a bench or table 10 (Fig. 1) supported by legs 12 and having an opening 14 in its central portion in which the operating instrumentalities are positioned. A large casting 16 is rigidly secured to the table 10 by bolts 17 and is provided with a horizontal surface 18 (Fig. 2) which fits the opening 14 in the table and forms the means for supporting the operating instrumentalities. The casting 16 is provided at its opposite ends with upstanding bosses 20 and 22 in which are slidably mounted vertical shafts 24, 26 arranged to slide in the bosses height-wise of the table 10. At their upper ends, the shafts 24, 26 have pinned thereto a crossbar or yoke piece 28 provided at its lower side with a T-shaped guideway 30. Mounted for sliding movement in the guideway 30 is a last holding or supporting member 32 provided with a spindle 34 (Figs. 1, 5 and 7) for entering the thimble in the heel end of a last, the spindle being split lengthwise and expansible by a screw 35 having a frusto-conical lower end which may be rotated by a handle or wrench 36 to expand the spindle 34, thereby providing a quick means for securing a last or form on the spindle. The last holding member 32 is secured in adjusted position in the guideway 30 by a binding screw 38.

In order to support a last or form rigidly on the crossbar 28, a toe rest 40 is also provided, the latter being carried on the lower end of a pin 42 secured in a holder 44 slidably mounted in the guideway 30. The holder is secured in adjusted position in the guideway by a binding screw 46. The toe rest may be adjusted heightwise in the holder 44 and secured in adjusted position by a thumb screw 48.

The vertical shafts 24, 26 are connected at their lower ends by a cross piece 50 which is pinned to the shafts as shown in Fig. 1. The fixed casting 16 is provided on its lower side with a cylinder 52 which is located centrally of the supporting plate 18 and is secured to the casting by a plurality of bolts 54. The cylinder is provided with a piston (not shown) having a rod 56 projecting from its bottom end and extending through a hole in the crosspiece 50, the rod being secured to the crosspiece by a setscrew 58. The cylinder 52 is connected by a flexible hose 60 to a compressed air unit of any usual type (not shown) through which compressed air is introduced into the top of the cylinder to force the piston downwardly and, through the rod 56, to move the crosspiece 50 and shafts 24, 26 downwardly, thereby moving the crossbar 28 downwardly together with the last-holding members 32 and 40 toward the supporting surface 18 on the fixed casting 16.

The shafts 24, 26 are limited in their downward movement by split collars 62, 64 secured respectively thereto by clamping screws 66, the collars engaging the bosses 20, 22 and thereby limiting downward movement of the shafts and the last supporting members 32 and 40. The supporting members are elevated into their inoperative position by exhausting the compressed air from the cylinder 52 by means of a vacuum pump (not shown), the pump being connected to the cylinder by another flexible hose 68 (Fig. 1). The flexible pipes 60 and 68 are connected respectively to the cylinder 52 through valves 70, 72 and conventional piping 74, the latter being provided with a pressure gage 76 to indicate the pressure in the cylinder and, consequently, the pressure being applied by the last or form to the work being operated upon. Since the compressed air mechanism may be of any known construction commonly used for operating compressed air pistons, it need not be described in further detail herein. Springs (not shown) may be provided, if necessary, to assist in returning the shafts 24, 26 and the last-supporting members 32 and 40 into their elevated positions.

The supporting surface 18 on the fixed casting 16 has the base plate 80 of a magnetic chuck mounted thereon, the chuck preferably being of the well-known permanent magnet type. The magnetic chuck has a three-point bearing on the supporting surface 18 by means of spaced screws 82, 84 (Figs. 2, 3 and 5) threaded through lugs provided on the right-hand end of the base 80, as viewed in Figs. 2 and 3, and a single screw 86 threaded through a lug formed on the central portion of the left-hand end of the base, these screws permitting the angular position of the magnetic chuck to be adjusted lengthwise and widthwise relatively to the supporting surface 18 and also relatively to a last or form held by the suppporting members 32 and 40.

The permanent magnets of the chuck are contained in a rectangular frame or housing 88 about three inches high secured by screws to the base plate 80, the frame having a top plate 90 fastened thereto by screws and shaped lengthwise to correspond to the longitudinal contour of the bottom of the last upon which the shoe is to be made which is to receive the innermold to be pressed in the molding device. The top plate 90 is substantially flat widthwise, as shown in Figs. 2 and 5 and has plane forepart and rearpart portions and a central portion having the profile of the shank portion of a shoe bottom. The permanent magnets comprise a plurality of rectangular blocks or bars 87 (Fig. 5) of magnetizable material such as steel which rest on the base plate 80 and are secured together by three long brass rods 89 which extend horizontally through holes in the bars and are threaded at one end to receive nuts which clamp the magnets together to form a single unit. As illustrated in Fig. 5, the magnets 87 are alternately wide and narrow and are separated about ⅛ of an inch from each other by spacing washers 91 composed of non-magnetizable material such as copper or brass, these washers being mounted on the rods 89. The thin magnet 87 at the left-hand end of the unit, as viewed in Fig. 5, is provided with a horizontal lug 92 which extends to the left and has a vertical slot cut therein into which a pin 95 extends, this pin being mounted eccentrically on the hub of a handle 94 and forming a crank which may be operated to slide the magnets 87 as a unit to the left or right on the plate 80 when the handle is rotated. The handle 94 pivots about a pin 97 fastened in the housing 88.

The top plate 90 of the magnetic chuck has a plurality of elongated parallel slots 93 formed widthwise thereof, each slot being normally located opposite one of the narrower magnets 87, as shown in Fig. 5, and being approximately equal in width to the magnet and the spacing washers at each side of the magnet. Mounted centrally of these slots are soft iron blocks 97 which produce channels at the outer walls of the slots which are filled with lead or other non-magnetizable material, thereby isolating the blocks 97 from the rest of the top plate 90 to form "islands" opposite the thinner magnets 87. When the top plate is located in the position illustrated in Fig. 5, with the handle 94 swung to the left, the narrow magnets 87 are in alinement with the blocks or islands 97 so that a path is established through the top plate 90 through which the lines of force or magnetic flux can flow to create a magnetic field in the space above the top plate. Consequently, any magnetizable material resting on the top plate with the magnets in the position shown in Fig. 5 will be pulled firmly against the top plate and become substantially immovable by reason of the magnetic flux or field above the top plate. When the handle 94 is swung 180° to the right into the position illustrated in Fig. 6, the permanent magnets 87 are slid to the right so that the narrower magnets are not in alinement with the blocks 97 but are located centrally of the wider steel sections of the top plate 90 extending between the blocks. Accordingly, the magnetic flux of the permanent magnets will now flow from the narrow magnets 87 into these wide sections of the top plate and then downwardly again through the wider magnets 87. In other words, in this position the top plate 90 acts to by-pass the magnetic flux of the permanent magnets and thereby to weaken or eliminate the magnetic field above the surface of the top plate 90. Any magnetizable material resting on the top plate with the magnets in the position shown in Fig. 6, therefore, will not be pulled against the top plate but will be relatively free to move on the top plate except for the small amount of residual magnetism which may remain in the blocks in the top plate. The two positions of the handle 94 are determined by the stops on the housing 88 and are indicated by the words "on" and "off".

The contoured plate 90 in the present device not only forms the top plate of the magnetic chuck, but it also serves as a mold or bed upon which moldable material M (Figs. 5 and 6) may be placed to be pressed into an innermold for a shoe by a molding member consisting of a last or form L rigidly supported above the plate 90 by the supporting members 32 and 40. In other words, the top plate of the magnetic chuck forms a stationary mold for shaping one surface of the innermold to be made in the molding apparatus. The last or form L forms the other molding element of the apparatus for cooperating with the top plate and shaping the opposite surface of the innermold, the last illustrated in the drawings having a bottom surface thereon which conforms to the shape of the bottom of the foot for which the innermold is to be made. The last L and the plate or mold 90 are moved toward each other by lowering the last-holding members 32 and 40 by the fluid pressure means described above to mold the innermold material M placed on the lower mold or plate 90, the pressure being controlled by the valve as indicated by the pressure gage 76. The moldable material for forming innermolds for shoes is preferably a plastic material composed of ground cork and pyroxylin although other moldable materials could of course be used if desired.

It is always desirable in molding innermolds for shoes, and also when performing other molding operations, to cause the molded article to conform as closely as possible in outline to the final shape or periphery desired on the finished article. This permits the article to be molded to the proper thickness in a single operation and also eliminates the necessity of excessive trimming of the article to obtain the desired outline after it has been molded. Moreover, in most molding operations, it is usually necessary to confine the moldable material at the sides or edges of the molds in order to accomplish the desired results. To this end, means is provided in the present apparatus for confining the moldable material and conforming it to the outline or periphery desired on the finished article prior to and during the molding operation, this means being equally useful, however, in establishing the true outline or periphery of any irregularly shaped object which is to be reproduced by molding or otherwise, or concerning which measurements may be desired which cannot be easily taken by tapes, calipers or other conventional measuring instruments.

As illustrated in the drawings, the confining or measuring means comprises a closed flexible member 96 in the form of a thin continuous fence or dam which is adapted to rest edgewise upon the contoured top plate 90 and to surround the last, form or other member which, in the present case, forms the cooperating element or mold of the molding apparatus. The flexible member 96 is preferably composed of metal, such as spring steel, and it is made up in four sections about two and one-half inches high. A toe section 98 and a heel section 100 are curved to extend respectively around the toe and heel portions of the last or form L and two side sections 102, 104 are located at the opposite side of the shank portion of the last, the bottom edges of the sections being shaped to correspond generally to the longitudinal contour of the top plate 90.

As illustrated in Fig. 2, the toe and heel sections 98, 100 of the flexible fence 96 overlap the side sections 102, 104 and are secured thereto by rivets 106 which are secured in the side sections and slide in elongated slots 108 provided in said toe and heel sections, thereby permitting relative sliding movement of the sections on the top plate 90. It will be seen from the foregoing that inward movement of the toe and heel sections 98 and 100 toward the center of the plate 90 will cause the fence to contract or grow smaller lengthwise and widthwise, whereas outward movement of these sections away from the center of the plate will cause the fence to expand, the rivets 106 sliding in the slots 108 in the toe and heel sections. Consequently, the flexible member or fence 96 can be contracted and caused to conform to the shape of any object it surrounds merely by bringing it into engagement with the object, thereby establishing or determining the shape of the periphery or outline of such object in a plane substantially normal to the plane of the fence. The action referred to is, of course, limited by the range of the contracting and expanding movement of the fence permitted by the pin and slot connections between the four sections.

The flexible fence 96 is caused to contract or expand lengthwise of itself by the following mechanism. The heel section 100 has a pair of pins 110 secured to one side thereof by rivets 109 (Fig. 4), these pins being provided at their bottom ends with large circular feet or disks 112 which rest on the top plate 90. The section 100 has a similar pair of pins secured to its opposite side and a single pin 114 riveted to its intermediate portion opposite the heel end of the last L, this single pin likewise having a circular foot 116 thereon. The pins 110 carry a spanner or yoke member 118 having a slot 120 therein (Fig. 4) in which is pivoted on a pin 122 a piston rod 124. This same construction is provided at the opposite side of the heel section 100, at both sides of the toe section 98 and at the front end of said toe section, as illustrated in Figs. 2 and 3. Each of the side sections 102, 104 of the fence 96 has a single piston rod 124 connected to its central portion by a pin 110 having a triangular foot 113 at its lower end.

The top plate 90 has an elongated bar 126 secured by screws to each of its longer sides (Figs. 2 and 3) and each of these bars is provided with three outwardly projecting lugs 128 having vertical bosses 130 formed at their outer ends. The bosses 130 support horizontal cylinders 132 which, as illustrated in Fig. 4, have the piston rods 124 mounted for sliding movement therein. The cylinders 132 are secured to the bosses 130 by threaded pipe connections 134 which render the joints airtight but permit the cylinders to rotate in a horizontal plane relatively to the bosses, the pipes 134 having passages 136 therein leading into the chambers of the cylinders. Each piston rod 124 has a collar or washer 135 fastened by a screw to its inner end, this collar being preferably composed of fiber or rubber and forming in effect a piston which prevents air from escaping from the front end of the cylinder. The lower ends of the bosses 130 are connected by usual T-joints 137 to pipes or tubes 138 which, as illustrated in Figs. 2 and 3, form a pipe line which extends from the forward left-hand boss 130 completely around the apparatus and terminates at the rearward left-hand boss which has no pipe leading from it and thus forms the end of the pipe line. The boss 130 forming the end of the pipe line 138 is actually located at the front right-hand side of the apparatus, as shown in Fig. 1, this end being illustrated in Figs. 2 and 3 as positioned at the rear of the device because these views were taken looking from the back of the machine. Accordingly, as shown in Fig. 2, the forward left-hand boss 130, where the pipe line starts, is connected by a pipe 142 passing through a supporting bracket 144 to a three-way valve 146 of any usual construction and through which fluid under pressure, for example, compressed air, may be supplied to the pipe line 138 by a tube 147 from any convenient source of supply such as a compression pump (not shown). The valve 146 is provided with a handle 148 whereby it may be moved into one position to admit compressed air into the pipe line 138 which, in turn, feeds the cylinders 132 and thereby causes the piston rods 124 and pistons 135 to be forced forwardly in the cylinders to move the flexible fence 96 inwardly on the top plate 90 around the entire length of the fence to cause said fence to contract by reason of the pin and slot connections between the four sections thereof and thus cause the fence to contract or grow smaller. The contraction of the fence in this manner causes it to move into engagement with the side wall of the object, such as the last or form L, which has been rigidly mounted in the device on the supporting members 32 and 40 and has been moved downwardly by the piston in the vertical cylinder 52 so that the fence surrounds the last. When the flexible fence 96 is moved inwardly against the last as just described, or against any other object supported by the members 32, 40, it will conform itself lengthwise substantially to the periphery of the object. In this way the flexible fence establishes the shape of the outline or periphery of the supported object which, in the present case, constitutes one of the cooperating elements for pressing or molding an innermold for a shoe.

The handle of the three-way valve 146 may be turned into another position at the end of the molding operation to close the inlet passage admitting compressed air to the pipe line 138 and to open an outlet pipe 150 leading to a vacuum pump (not shown) which exhausts the air from the cylinders 132 and thereby retracts the pistons 135 and rods 124 and moves the flexible fence outwardly again away from the object and into its original open position on the plate 90. The feet 112, 113 on the four sections of the flexible fence maintain the latter in an upstanding position during this lateral movement on the plate 90. Consequently, the fence may be contracted or expanded at the will of the operator by means of the three-way valve 146 to move the fence into engagement with the periphery of any object supported by the members 32 and 40, or to move it away from such object. In cases where the periphery of an object is considerably different in shape from the curved outline of the last or form illustrated herein, the cylinders 132 and piston rods 124 could of course be located at different positions around the fence or, if conditions warranted, more or fewer sections could be used when constructing the fence.

After the flexible fence 96 has been brought into positive engagement with the last L completely around its periphery by inward movement of the pistons 135, the handle 94 of the magnetic chuck is swung from its "off" into its "on" position, as shown in Fig. 5, to cause the permanent magnets 87 to set up a magnetic field or flux in the space above the top plate 90 occupied by the fence, thereby holding or locking the fence rigidly in position on the top plate as long as the magnetic field is maintained. The flexible fence having been thus locked in position to define or establish the actual periphery or outline of the last L in a plane normal to the plane of the fence, the latter may be utilized in a molding operation, as will be presently described, or the fence may, if desired, be used to determine the true outline or shape of the last in the plane referred to. Measurement lengthwise and widthwise of the last can usually be taken from the rigid fence more easily than from the curved last or form itself and dimensions, particularly dimensions of certain portions or sections of the last, could be more readily ascertained.

Although the use of the present apparatus for the purpose of making inner molds for shoes will be plain from the foregoing description, a brief summary of its operation will be given for the purpose of clearness. The last L is mounted on the spindle 34 (Fig. 1) with its toe end engaging the toe rest 40, the screw 35 being rotated by the handle 36 to spread the spindle and cause it to hold the last rigidly in position. At this time the piston rods 124 are located in their retracted or inoperative positions. The valve 70 (Fig. 1) is then opened to permit compressed air to enter the large cylinder 52 and lower the last until it comes into the range of the flexible fence 96, after which the valve is closed. The three-way valve 146 is next opened by the handle 148 to permit compressed air to pass into the pipe line 138 and move the piston rods 124 and flexible fence 96 inwardly into engagement with the side wall of the last, the four sections of the fence sliding relatively to each other on their pin and slot connections as they move inwardly to contract the fence and cause it to grow smaller. The fence is thus caused to engage the side wall of the last completely around the same and to conform itself substantially to the periphery of said last in a plane normal to the fence.

The handle 94 controlling the permanent magnet is then swung 180° to the left into the operative position illustrated in Fig. 5 to set up a magnetic field in the space above the top plate 90 and lock the flexible fence rigidly in its conformed position, thereby establishing the shape of the periphery of the last and permitting the latter, if desired, to be moved upwardly out of the range of the fence. To accomplish this, the valve 72 may be opened to permit the vacuum pump to exhaust the air from the vertical cylinder 52 and thus elevate the crosspiece 28 and the last supported thereby. The last will slide upwardly out of contact with the fence with relatively little friction. Since the three-way valve 146 is still open, the piston rods 124 are tending to urge the flexible fence inwardly on the top plate 90 to contract the fence further. The magnetic flux of the permanent magnet prevents this, however, and holds the fence rigidly in its conformed position after the last has been removed. Moldable material M, such as the ground cork and pyroxylin composition referred to, may then be placed on the plate 90 within the space enclosed by the flexible fence, the amount of material being determined by the size of the last and the thickness of the inner mold desired in the finished shoe. The valve 72 is then closed and the inlet valve 70 opened to lower the piston in the vertical cylinder 52 and move the last downwardly to compress the moldable material between the contoured top plate 90 and the bottom surface of the last L. The amount of pressure applied to the innermold material may be controlled by the inlet valve 70 and will be indicated by the pressure gage 76. The magnetic flux is maintained during the pressing operation, thereby insuring that the flexible fence will remain stationary so that the edge of the inner mold will conform in outline to the shape of the portion of the last engaged by the fence.

After the molding pressure has been maintained long enough to form the inner mold, the valve 72 is opened to exhaust the air from the vertical cylinder 52 and cause the last to be elevated into its upper or inoperative position. The handle 94 on the magnetic chuck is then swung to the right into the inoperative position shown in Fig. 6 to weaken the magnetic field and thus permit the flexible fence 96 to move freely on the top plate 90. The valve handle 148 is turned to open the pipe line 138 to the exhaust pump through the tube 150 and thereby cause the flexible fence to be returned into its expanded or inoperative position through outward movement of the pistons 135. The completed inner mold is then free to be removed from the top plate 90.

Although the present invention has been described herein by way of example as being used in connection with the molding of inner molds for shoes, the invention is not limited to such use since it might be used with equal advantage in connection with the molding of other objects or, as stated above, it might also be used for obtaining measurements from irregularly shaped objects or for determining the true shapes of their outlines or peripheries.

Having thus described our invention, what we claim as new and desire to secure by Letters Patent of the United States is:

1. A device for determining the shapes of curved objects comprising, in combination, means for holding a curved object in a predetermined position, a closed flexible member arranged to surround said object and to contract and expand lengthwise of itself to move into and out of engagement with said object completely around the periphery thereof, said flexible member conforming to the outline of said object when moved into engagement therewith, operator-controlled means for contracting and expanding the flexible member to move it into and out of engagement with said object, means for supporting said flexible member during its contracting and expanding movement, and means carried by said supporting means for locking the flexible member in any position into which it may be moved by said operator-controlled means.

2. A device for ascertaining and establishing the contours of curved objects comprising, in combination, means for supporting a curved object rigidly in the device, a closed flexible fence a magnetizable material arranged to surround said object and to be contracted and expanded lengthwise of itself to move laterally into and out of engagement with the periphery of said curved object, said fence conforming to the outline of said object when moved into engagement therewith and thereby determining the shape of said outline, fluid pressure operated means for moving the fence into and out of engagement with said object, and a magnetic chuck for supporting said fence during said lateral movement and for thereafter setting up a magnetic flux to hold the fence rigidly in position when it is in engagement with the periphery of said curved object, thereby establishing the contour of said object in a plane substantially normal to said fence.

3. A molding apparatus having, in combination, a mold having a molding surface thereon which is flat in one direction, a mold cooperating with the first-named mold and having an irregularly shaped periphery, means for effecting relative movement between said molds to apply molding pressure to moldable material placed on the first-named mold, a closed flexible member of magnetizable material resting on the first-named mold and adapted to confine the moldable material in the space enclosed by said flexible member, said member being adapted to surround the cooperating mold as the molds move together and being arranged to contract and expand lengthwise of itself to move laterally on the first-named mold into and out of engagement with the irregular periphery of said cooperating mold, fluid pressure operated means for contracting and expanding said flexible member, said member conforming in outline to the periphery of said cooperating mold when moved into engagement therewith, thereby confining the moldable material within a space corresponding in outline to said periphery, and a magnetic chuck embodied in the first-named mold for magnetizing said flexible member and holding it rigidly against the periphery of said cooperating mold during the pressure applying operation.

4. An endless flexible fence constructed and arranged to surround an object and to contract and expand thus to move alternately into and out of engagement with the object, a plurality of members mounted on the outer surface of the fence and spaced from each other longitudinally of the fence, a plurality of feet fixed to said members and arranged to support the fence, a plurality of fluid pressure operated pistons for expanding and contracting the fence, means connecting the pistons to said members, and a valve for controlling the operation of the pistons.

5. An endless flexible fence constructed and arranged to surround an object and to contract and expand thus to move alternately into and out of engagement with the object, a plurality of members mounted on the outer surface of the fence and spaced from each other longitudinally of the fence, a plurality of feet fixed to said members and arranged to support the fence, a plurality of fluid pressure operated pistons for expanding and contracting the fence, a plurality of spanners each connecting the two adjacent members, means connecting the pistons to the spanners, means for conducting pressure fluid to the pistons, and means for controlling the flow of pressure fluid through the conducting means.

6. A device for determining the peripheral outlines of objects comprising a superstructure for rigidly supporting a curved object, an endless flexible fence constructed and arranged to be contracted and expanded in order to bring it into and out of engagement with the periphery of said curved object, a plurality of feet of magnetizable material fixed to and projecting outwardly from the fence, and a magnetic chuck for supporting the feet for sliding movement during the contraction and expansion of the fence for setting up a magnetic flux to hold the feet immovable relatively to the chuck when the fence is in engagement with the periphery of said curved object.

7. Apparatus for use in making innermolds for shoes comprising a last-shaped form, a plate having a plane forepart, a plane rear part and a central portion having a profile corresponding to the profile of the shank portion of a shoe bottom, an endless fence surrounding the last-shaped form and making a tight edge contact with the plate, said fence comprising central sections mounted on the central portion of the plate and movable widthwise thereof and end sections mounted on the forepart portion and the rear part portion respectively of the plate and movable both lengthwise and widthwise of the plate, pistons for contracting the fence in order to bring it into engagement with the last-shaped form, means for conducting pressure fluid to the pistons, and a valve for controlling the flow of pressure fluid through the conducting means.

8. Apparatus for use in making innermolds for shoes comprising a last-shaped form, a plate having a plane forepart, a plane rear part and a contoured central portion, a closed fence surrounding the last-shaped form and making a tight edge contact with the plate, said fence comprising central sections mounted on the central portion of the plate and adjustable widthwise thereof and end sections mounted on the forepart portion and the rear portion respectively of the plate and adjustable both lengthwise and widthwise of the plate, a plurality of feet of magnetizable maternal fixed to the several sections of the fence respectivly and projecting outwardly therefrom, and a magnetic chuck incorporated in the plate and arranged to support the feet for sliding movement during the adjustment of the sections of the fence and for setting up a magnetic flux to hold the feet immovable relatively to the chuck when the fence is in engagement with the periphery of the last-shaped form.

References Cited in the file of this patent

UNITED STATES PATENTS

| Number | Name | Date |
| --- | --- | --- |
| 152,910 | Miller | July 14, 1874 |
| 167,676 | Lambert | Sept. 14, 1875 |
| 1,207,673 | Willard | Dec. 5, 1916 |
| 1,563,096 | MacDonald | Nov. 24, 1925 |
| 1,822,039 | Kinney | Sept. 8, 1931 |
| 2,138,974 | MacDonald | Dec. 6, 1938 |
| 2,226,758 | Fausse | Dec. 31, 1940 |
| 2,330,989 | Nevills | Oct. 5, 1943 |
| 2,424,835 | Luckey et al. | July 29, 1947 |
| 2,487,944 | Pressman | Nov. 15, 1949 |
| 2,528,353 | Ferla | Oct. 31, 1950 |
| 2,613,394 | Doherty | Oct. 14, 1952 |